United States Patent
Haner et al.

(10) Patent No.: US 9,346,213 B2
(45) Date of Patent: May 24, 2016

(54) METHOD FOR PRODUCTION CONTROL IN STRETCH BLOW MOLDING OF PLASTIC CONTAINERS AND A TEST PREFORM

(71) Applicant: KRONES AG, Neutraubling (DE)

(72) Inventors: Arno Haner, Wiesent (DE); Gerald Huettner, Vilseck (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/321,283

(22) Filed: Jul. 1, 2014

(65) Prior Publication Data
US 2015/0037518 A1 Feb. 5, 2015

(30) Foreign Application Priority Data
Aug. 5, 2013 (DE) .......................... 10 2013 215 372

(51) Int. Cl.
| | | |
|---|---|---|
| B32B 3/02 | (2006.01) | |
| B29C 49/78 | (2006.01) | |
| B29C 49/42 | (2006.01) | |
| B29C 49/12 | (2006.01) | |
| B29C 49/80 | (2006.01) | |
| B29C 49/06 | (2006.01) | |
| B29B 11/14 | (2006.01) | |

(52) U.S. Cl.
CPC .................. *B29C 49/78* (2013.01); *B29C 49/12* (2013.01); *B29C 49/4205* (2013.01); *B29C 49/783* (2013.01); *B29C 49/786* (2013.01); *B29C 49/80* (2013.01); *B29B 11/14* (2013.01); *B29C 49/06* (2013.01); *B29C 2795/002* (2013.01); *Y10T 428/1352* (2015.01)

(58) Field of Classification Search
CPC ........ B29C 49/04; B29C 49/06; B29C 49/78; B29C 49/6409; B29C 47/92; B29C 2945/76461; B29C 2945/76491; B29B 11/08; Y10T 428/13
See application file for complete search history.

(56) References Cited

U.S. PATENT DOCUMENTS

| | | | |
|---|---|---|---|
| 4,131,666 | A | 12/1978 | Agrawal et al. |
| 6,143,234 | A | 11/2000 | Van Horn et al. |

(Continued)

FOREIGN PATENT DOCUMENTS

| | | |
|---|---|---|
| CN | 1189309 | 2/2005 |
| CN | 200977723 Y | 11/2007 |

(Continued)

OTHER PUBLICATIONS

Search Report for DE 10 2013 215 372.4, dated Apr. 9, 2014.
Office Action, Chinese Patent Application No. 201410390516.1, issued date Mar. 29, 2016.

*Primary Examiner* — Elizabeth Mulvaney
(74) *Attorney, Agent, or Firm* — Marshall, Gerstein & Borun LLP

(57) ABSTRACT

A method for production control in stretch blow molding of plastic containers in a blow molding machine, and a test preform for the use therewith, and a blow molding machine for performing the method. At least one test preform with a regular and/or in particular equidistant, printed test pattern is fed into a stream of product preforms entering the blowing molding machine. Furthermore, the product preforms and the test preform are in the continuous operation of the blow molding machine blown to form product containers and to form a test container and the test container is imaged with at least one camera. The product quality during the ongoing test operation can thereby with imaged test container be performed flexibly and selectively.

17 Claims, 2 Drawing Sheets

(56) References Cited

U.S. PATENT DOCUMENTS

| | | | |
|---|---|---|---|
| 2003/0020193 A1* | 1/2003 | Hamamoto | B29C 49/0073 264/40.1 |
| 2008/0211125 A1 | 9/2008 | Derrien et al. | |
| 2012/0052226 A1 | 3/2012 | Gleixner | |
| 2012/0088060 A1 | 4/2012 | Huettner | |
| 2012/0226376 A1* | 9/2012 | Haesendonckx | B29C 49/78 700/109 |

FOREIGN PATENT DOCUMENTS

| | | |
|---|---|---|
| DE | 2846304 A1 | 4/1979 |
| DE | 60103703 T2 | 6/2005 |
| DE | 102010036103 A1 | 3/2012 |
| EP | 0793569-D1 | 9/1997 |
| EP | 1175990 A1 | 1/2002 |
| WO | WO-9615896 A1 | 5/1996 |

\* cited by examiner

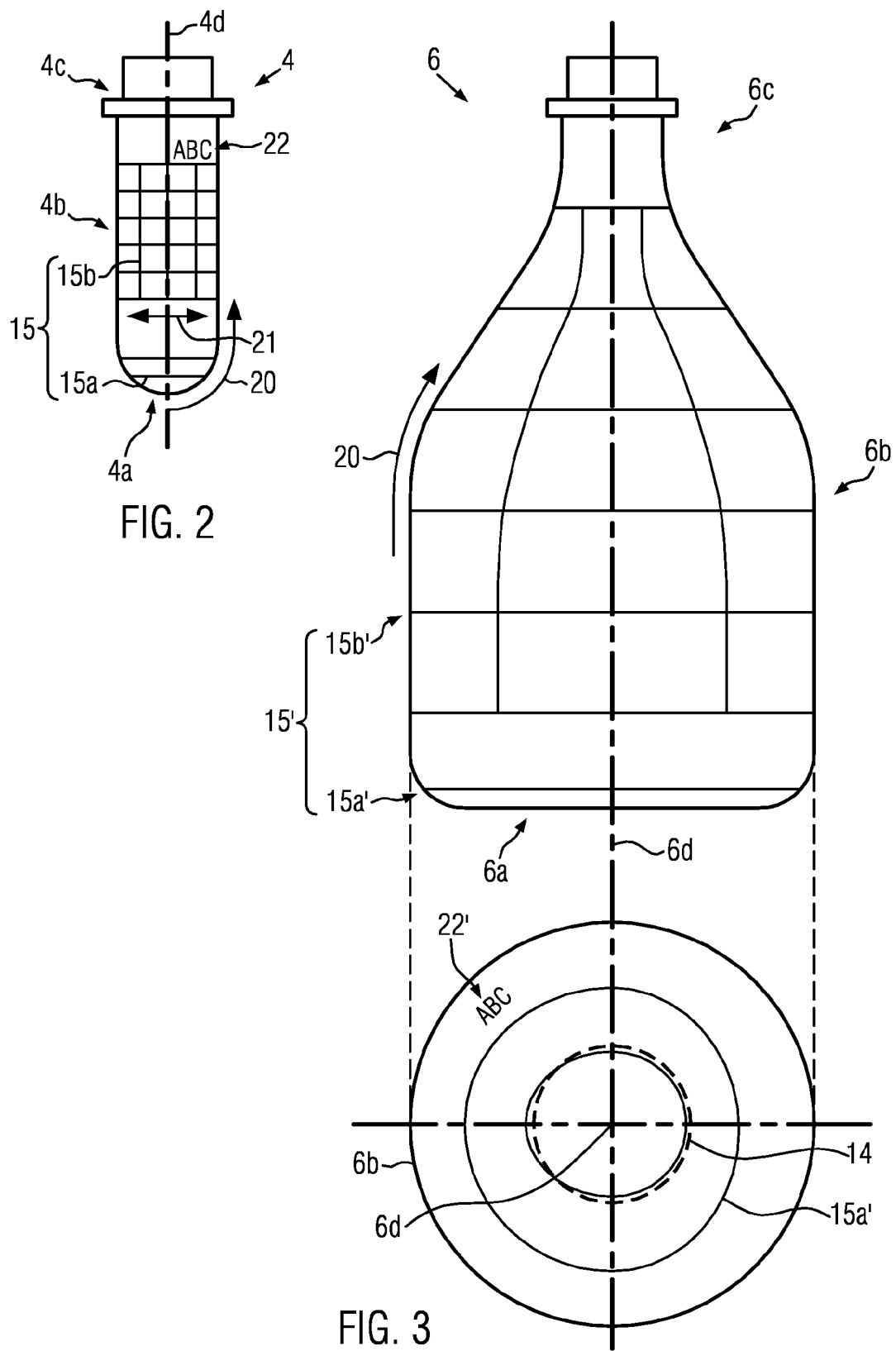

METHOD FOR PRODUCTION CONTROL IN STRETCH BLOW MOLDING OF PLASTIC CONTAINERS AND A TEST PREFORM

CROSS-REFERENCE TO RELATED APPLICATION

The present application claims priority to German Application No. 10 2013 215 372.4, filed Aug. 5, 2013. The priority application, DE 10 2013 215 372.4 is hereby incorporated by reference.

FIELD OF THE DISCLOSURE

The disclosure relates to a method for production control in stretch blow molding of plastic containers in a blow molding machine, a test preform for performing the method, and a device for performing the method.

BACKGROUND

In stretch blow molding plastic containers from heated preforms, individual wall portion of the preforms are drawn to different degrees resulting in wall portions of the container having different thicknesses. Drawing individual wall portions can be selectively influenced by machine parameters when heating and blowing the preforms. Accordingly, depending on the fluctuation of these parameters, the drawing varies for individual blow cavities, heating devices and/or depending on the material properties and dimensions of the preforms. For example, asymmetric wall stretching in the region of the container base can occur in relation to the outer circumference of the blown container reproducibly predetermined by the blow cavity.

To control the material distribution in the blow molded containers, it is known, for example, from U.S. 2008/0211125 A1, to reproducibly divide the wall portions of preforms by ring-shaped thickenings in the longitudinal direction and to measure the position of the thickenings on the blown container in order conclude therefrom the distribution of the wall thickness of the container thus produced. With such thickenings, however, only wall thickness distributions of the container can usually be determined in the longitudinal direction. Furthermore, the thickenings on the manufactured container are visible and—depending on the intended purpose—disturb the appearance of the container.

It is also known from DE 28 46 304 A1, within the framework of test series for optimizing the preheating of preforms for subsequent stretch blow molding, to attach grid-like markings onto the preforms and to monitor them after stretch blow molding the containers in order to estimate material distribution in the produced container wall. For ongoing production control, however, such markings have been viewed as being too expensive and not sufficiently reproducible. For example, infrared transmission measurements are used instead on the produced container walls.

Machine control of blow molding machines in dependency of results of the inspection of the produced plastic containers is also known from EP 07 93569 D1, for example, by inspection for defects in the bottle walls.

In contrast thereto, however, there is the need for methods of production control in stretch blow molding of plastic containers with which meaningful test cycles for wall thickness distribution can be realized as flexibly as possible and with little interference with ongoing production cycles.

SUMMARY OF THE DISCLOSURE

A method for production control in stretch blow molding of plastic containers and a test preform for the same one provided by the disclosure. The method according to the disclosure includes: a) infeeding at least one test preform, with an in particular regular and/or equidistant, printed test pattern, into a stream of product preforms entering the blow molding machine; b) blowing the product preforms and the test preform during the continuous operation of the blow molding machine to form product containers and to form a test container; and c) imaging the test pattern on the test container with at least one camera.

The product containers are plastic containers made from the product preforms and intended for use, such as bottles or the like. The blow molding machine is, for example, a rotary type stretch blow molding machine. The product preforms are preferably made of PET. The test preform is a product preform with at least one optically evaluable printed test pattern, for example using direct printing, inkjet printing, offset printing, pad printing or screen printing.

A regular test pattern is to be understood such that the pattern follows a verifiable rule, so that deviations from the rule can be determined by imaging. Such rules can be constituted by geometrical figures, recurring points and/or lines or the like distributed on the surface of the test preform. An equidistant test pattern is to be understood such that grid points, grid lines, circular lines or the like are present on the test preform with uniform surface spacing.

Such rules may also be given in that the location and the course of individual test features on the test preform are known, for example, in the form of a diagonal line extending on the surface having a suitable line width, such that any distortion of the line during blow molding can be visually recognized and evaluated in the camera image. This would be the case, for example, with a line printed having a uniform line width that tapers on the blown container and/or is curved in a certain direction.

The test pattern of the test container is during blow molding stretched and distorted depending on the specific drawing of the wall portions disposed therebeneath. Based on the test pattern on the test preform, being in particular regular and/or equidistant, the specific stretch of the test pattern allows for a conclusion, which is easily determined by optical devices—about the reduction of the wall thickness of the respective wall portion disposed therebeneath and about the wall thickness distribution along the container wall provided with the test pattern.

Continuous operation of the blow molding machine is to be understood such that it is under realistic production conditions fed at least one test preform, for example, directly subsequent to a production cycle for the continuous processing of product preforms. The blow molding machine can presently also work in a clocked manner and therefore does not necessarily need to comprise a continuously rotating blow molding carousel. The test preform is then, for example, fed in during the normal operating cycle of the blow molding machine.

Imaging the test container is preferably performed with incident light. It would also be conceivable to generate a bright-field behind the test pattern, for example, in that a diffusion means is provided in the interior of the test container and/or test preform and illuminated. Illumination is then effected, for example, through the container opening. The diffusion means can, for example, be formed by a mist arising when relaxing the blowing pressure in the completely blow molded container.

The camera creates at least one image data set for every test container which can be evaluated in an associated computer or the like. Imaging the test pattern allows two-dimensional quality control of the associated wall portion. The evaluation is preferably effected by measuring at least one partial region of the test pattern stretched during blow molding. There may be a plurality of cameras, for example, in combination with a set of mirrors for imaging different wall portions of the test container with the stretched test pattern and jointly evaluating them.

The test pattern on the test preform is preferably also registered by imaging. This allows for each test container to be assigned an individual reference image of the regular test pattern. The test pattern is preferably then measured both at the entry side as well as at the exit side. Inaccuracies in the production of the test pattern on the test preform can be compensated by such individual reference back to the respective test preform.

The test preform is preferably fed at a predetermined product stream position into the incoming stream. Predetermined blow cavities and/or heating elements can thereby be specifically and selectively for the test preforms. This allows both tracking the test preform and/or the test container in the product stream as well as reliable allocation of camera images generated for the inspected test containers and/or test preforms.

Similarly, the test preforms can in the sense of a trial-and-error process be continuously fed in and/or created, and production parameters, for example of the blow molding machine, can be changed until prescribed quality criteria have by imaging been detected on blown test containers, for example, for production release. Such a procedure is particularly helpful during production start and/or a change to a new type of container.

The test container is preferably allocated a blow cavity of the blow molding machine for blowing the test container and/or a heating element used for in particular individually heating the test preform. This allows individual control of operation of the blow cavities and/or the heating elements. The latter are, for example, heating chambers and/or heating mandrels designed for heating individual preforms. By use of the test container, the devices for preheating and/or blowing respectively employed can therefore be individually optimized.

The imaged test pattern of the test container is preferably by using image evaluation measured and/or compared with at least one reference pattern. Suitable for this are, for example, image evaluation algorithms known pre se for respective powerful image processing libraries. With the aid of image evaluation, the test pattern can relatively quickly be evaluated in terms of characteristic distortions created by drawing individual wall portions. Image evaluation allows, in particular, two-dimensional evaluation of the wall region being imaged. In contrast to wall thickness measurements based on radiation transmission by individual wall portions, optical interferences as they arise, for example, by mold seams and/or inaccuracies of the measuring position play only a minor role, provided that the test pattern is recognized.

Meaningful results in terms of the wall drawn in the longitudinal direction of the container produced, in the circumferential direction, and/or in a base portion of the container can already be obtained using individual camera images. Image processing devices are particularly advantageous due to the product flow rates up to 10 m/s that they allow. For example, positioning inaccuracies and optical pattern deformation caused thereby can be corrected by image processing analysis.

Preferably at least one machine parameter for heating and/or blowing the product preforms is evaluated and/or adjusted in dependency of a result obtained by image evaluation. This allows rapid feedback for optimizing the product quality during the ongoing production operation. For example, individual machine parameters can by specifically varied based on characteristic distortions of the in particular regular and/or equidistant test pattern. Such machine parameters are, for example, the temperature and duration of preheating the product preforms, the pre-blowing pressure or the like.

The machine parameter is preferably individually evaluated and/or adjusted for a blow cavity used for blowing the test container. This allows for uniform product quality for all blow cavities existing at the blow molding machine. For example, individual deviations of actual values from target values of individual blowing parameter can for the respective blow cavities be selectively compensated. This applies analogously to individual adjustable heating elements and their heating parameters.

When the machine parameter exceeds a permissible deviation from a target value, the blow cavity employed is preferably selectively fed at least one further test preform. For example, individual blow cavities can be specifically and selectively fed test preforms depending on the extent of the deviation, error frequency, and/or error probability. This reduces the effort for optimizing the blow molding machine as a whole, for example, in that additional control feeds are needed only for blow cavities operating improperly. On the other hand, production control for properly operating blow cavities can be reduced to minimum routine measures.

The test preform is preferably removed from a batch of preforms to be processed and to be controlled and the test pattern is printed thereonto. This allows for compensation of fluctuations in material properties and/or the dimensions of the product preforms between individual batches with the production control according to the disclosure. For example, the product preforms can be produced in an injection molding machine associated with the blow molding machine and have an associated printing unit directly print thereonto, for example, using inkjet printing. This ensures in particular that the product preforms and the test preforms are substantially identical in terms of the wall material and the dimensions.

Preferably, the test container, in particular at least one test container for every blow cavity formed at the blow molding machine, is automatically controlled after production of a predetermined number of containers and/or after a predetermined production period. Production cycles and test cycles can thereby be automatically strung together. This serves to maximize the available production capacity and/or the documentation of production and product quality.

The object is also satisfies with a test preform for performing the method according to the disclosure. According thereto, the test preform—in terms of its wall material and its dimensions—corresponds to a product preform, where in particular a regular and/or equidistant test pattern is further printed onto the test preform. This allows, firstly, divisionally accurate feed-in of the test preform in place of a product preform. Secondly, the product quality that can be expected of the product preforms in the product stream can be gathered directly from the control results obtained with the test preforms.

Control results obtained according to the disclosure can in a conventional manner be documented using electronic data processing. Data useful for this comprises, for example, user ID, time stamp, associated heating element associated blow cavity, other associated treatment assemblies, coded control number and camera images of the test container. It would also be possible to print the controller results onto the test container. They would then be available as comparison results for a separate follow-up control process, for example, when the container is cut apart, measured and/or weighed.

The test pattern according to the disclosure is by drawing the individual wall portions of the test preform during stretch blow molding stretched and in particular distorted, and in this manner allows a simple and reliable estimation of the respective wall thickness and, in particular, the wall thickness distribution in dependency of the degree of distortion of the, for example, regular and/or equidistant test pattern. Regular patterns are understood to be, for example, defined geometric figures and/or groups of geometric figures such as dot grid, lines, rectangles, circles, ellipses, or the like. Flat semi-transparent patterns that are printed, for example, with a predetermined and locally uniform degree of transparency are likewise conceivable. The degree of drawing when blown could then be determined by the change of the local degree of transparency, i.e. the difference of the degree of transparency between prior to and after the blow molding.

Preferably, the test pattern is printed onto the base portion of the test preform in the shape of concentric rings or ring segments which are then formed, in particular, equidistant to each other. And/or the test pattern is printed onto a side wall portion of the test preform in the shape of a grid that is equidistant, in particular, in the longitudinal and/or the circumferential direction of the test preform. This allows for detecting and evaluating undesirable asymmetric stretching regarding the longitudinal axis and/or the cross-section of the blown container in the base portion in a particularly simple and reliable manner. A grid being substantially orthogonal in the wrap of the container jacket surface allows an easy and meaningful estimate of the wall thickness distribution in the lateral region of the container. The test pattern is preferably configured in full circumference and/or rotationally symmetrical with respect to the main axis of the test preform. This increases the informative value of individual camera images of the equidistant test pattern distorted during stretch blowing, in particular, with partially circumferential imaging of the test container.

The test pattern preferably contains a fluorescent dye and is invisible to the human eye when illuminated in the visible spectral range, for example, with natural light. The test container can then remain in the product stream as a product container intended for use, provided that the control result complies with the criteria demanded from the test container. In other words, the test container then during proper use does not differ from a product container.

Preferably, the test preform according to the disclosure further comprises a print or other marking for identifying the test preform and/or the test container blown therefrom. The test preform and/or the test container can then be identified at any section of the conveying path of the preforms, and/or their position in the product stream can be determined.

Also disclosed is a blow molding machine for performing the method of the disclosure. According thereto, it includes a clocked infeed device with which the test preform according to the disclosure can be fed, in particular in a trackable manner, into the incoming stream of product preforms in order to selectively supply a blow cavity formed at the blow molding machine, in particular selectively, with the test preform, and at least one camera for imaging the test container blown in the blow cavity. The infeed device and the camera could basically also be retrofitted at the entry region and the exit region of existing blow molding machines.

DESCRIPTION OF THE DRAWINGS

A preferred embodiment of the disclosure is illustrated in the drawing.

FIG. 2 shows a test preform according to the disclosure; and

FIG. 3 shows a test container according to the disclosure.

DETAILED DESCRIPTION OF THE PREFERRED EMBODIMENT

Figure 1:
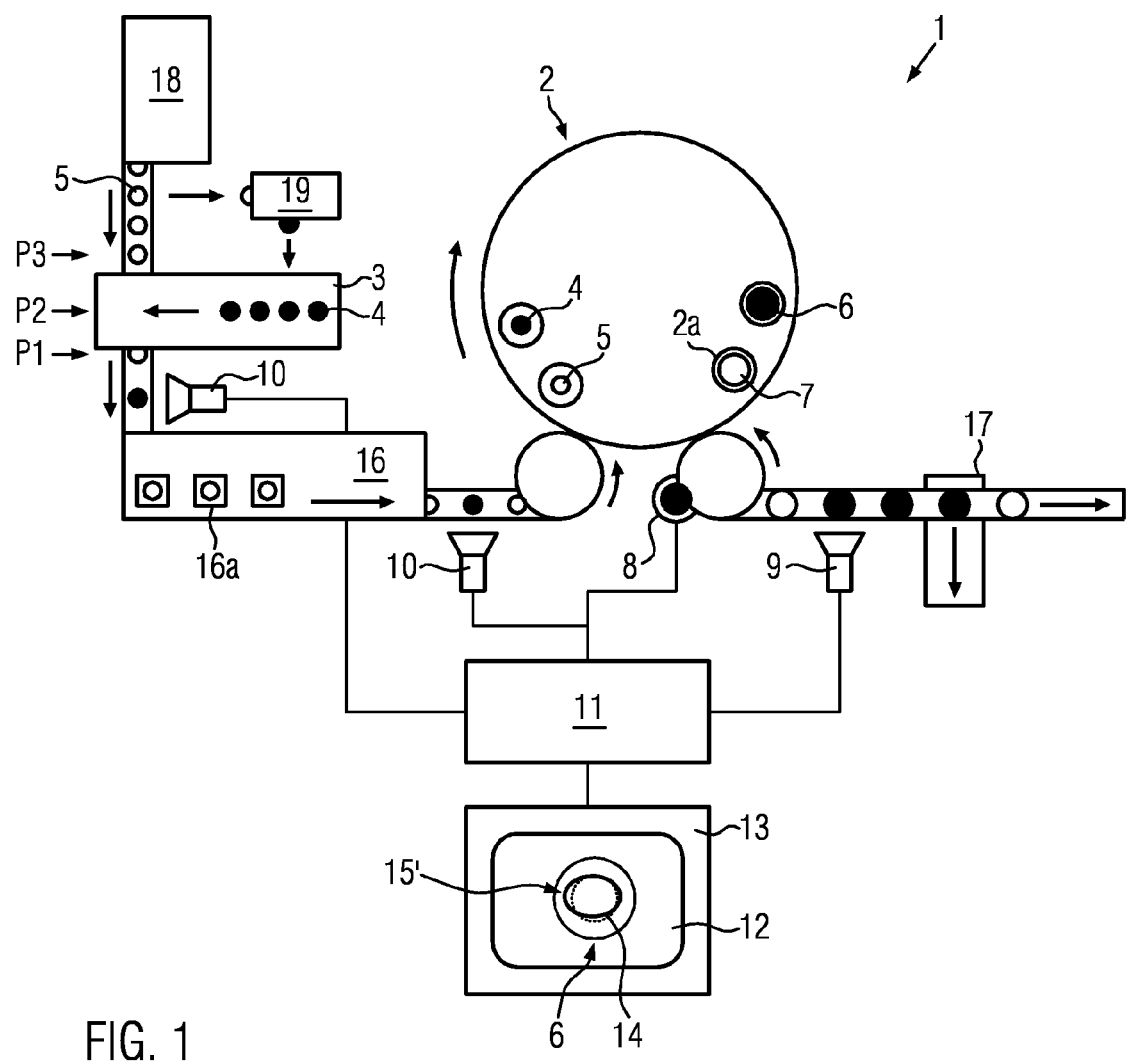
FIG. 1 shows a device according to the disclosure for producing and controlling blown containers.

As is disclosed in FIG. 1, the device 1 according to the disclosure for production control in stretch blow molding of plastic containers comprises a blow molding machine 2, an infeed device 3 for feeding test preforms 4 into an incoming stream of product preforms 5 that are produced by stretch blow molding or the like in the blow molding machine 2 to form test containers 6 and product containers 7 in a manner known per se. Furthermore, at least one camera 8, 9 is provided for controlling by imaging the test containers 6 produced in the blow molding machine 2. In the example shown, a first camera 8 is formed at the exit side beneath the passing container stream which is composed of a mix of test containers 6 and product containers 7 in order to image the container base 6a of the test containers 6 from below. Furthermore, a second camera 9 is disposed at the exit side for imaging the test containers 6 in a lateral view. Handling and transporting the preforms and containers in the device 1 according to the disclosure can be done in a manner known per se and is therefore not discussed any further.

At least one camera 10 is provided at the entry side with which the test preforms 4 can be imaged, for example, in a lateral view. The cameras 8, 9 at the exit side and the at least one camera 10 at the entry side are connected to an evaluation unit 11 that enables production control using image evaluation of camera images 12 recorded with the cameras 8, 9, 10. In the example shown, a camera image 12 of the test container 6 recorded with the first camera 8 at the exit side is displayed on a screen 13 together with a reference pattern 14 generated in the evaluating unit 11. This serves as a criterion for comparison with a test pattern 15' on the test container 6, which is created by stretching an in particular regular and/or equidistant test pattern 15 on the test preform 4 by blowing the test container 6. The nature of the test pattern 15 shall be described in detail with reference to FIGS. 2 and 3.

The product preforms 5 and test preforms 4 are in a furnace 16 heated for subsequent blow molding in the blow molding machine 2. A discharge device 17 is further preferably provided with which the test container 6 can be separated from the product stream of blown containers 7 streaming out.

Other optional components are an injection molding machine 18 for producing the product preforms 5 and a printer 19 for printing the test pattern 15 onto individual product preforms 5. Test preforms 4 can be produced with the printer 19 from a batch of product preforms 5 produced with the injection molding machine 18 in order to selectively control this batch. It would also be possible, however, to provide the test preforms 5 as separately produced test bodies, for example, if the injection molding machine 18 does not exist and/or as an accessory to a provided batch of product preforms 5.

The infeed device 3 operates in a clocked manner such that the product stream positions P2 of fed-in test preforms 4 in the stream of product preforms 5 at the entry side are known and trackable. In the example shown, a test preform 4 is fed in at the product stream position P2 between product stream positions P1, P3 of product preforms 5. Individual blow cavities 2a of the blow molding machine 2 and/or individual heating elements 16a of the furnace 16 can thereby be selectively fed test preforms 4. The heating elements 16a are, for example, heating chambers and/or heating mandrels, one for each preform. Individual blow cavities 2a and/or heating elements 16a can by image evaluation of camera images 12 be selectively inspected in terms of the product quality created therewith, in particular to correct their machine parameters selectively or for the entire machine when insufficient product quality is given.

The product stream position P2 of individual test preforms 4 and/or test containers 6 could also be determined and/or controlled using their identification in the camera images 12 of cameras 8, 9, 10. Identification by imaging then also allows for an allocation to separate quality controls of discharged test containers 6, for example, by taking additional measurements outside the device 1 according to the disclosure.

FIG. 2 in a schematic side view shows a test preform 4 according to the disclosure with the test pattern 15, which is formed, for example, in the shape of concentric rings 15a in the base portion 4a of the test preform 4 and in the shape of a grid pattern 15b in a side wall portion 4b of the test preform 4. As can further be gathered from FIG. 2, the test pattern 15 is formed in a portion that is stretched during the blow molding process beneath a schematically indicated support ring 4c. A main axis 4d of the test preform 4 is also indicated around which the rings 15a or functionally similar ring segments (not shown) are formed concentrically. Preferably, the rings 15a are—relative to the outer surface of the test preform—also formed at an equidistance to each other. In particular the grid pattern 15b is preferably formed to be equidistant. This is to be understood such that the distances between the grid points or the grid lines in the longitudinal direction 20 and/or in the circumferential direction 21 are printed having uniform surface spacings to each other. However, different test patterns 15 are also basically suitable, provided that they follow optically verifiable rules, such as geometrical figures.

The test preform 4—with the exception of the test pattern 15 and an optional identification marking 22—preferably corresponds to the product preform 5. This is to be understood such that the product preforms 5 and the test preforms 4 used for production control are substantially identical in terms of their dimensions and wall material. The test preform 4 then allows a particularly realistic statement about the drawing of the product preforms 5 during the blow molding process 5. The test pattern 15 and the optional identification marking 22 are printed onto the test preform 4, for example, using direct printing, inkjet printing, offset printing, pad printing, screen printing or the like. Printing allows for test patterns 15 to be equally reproducible and flexibly adaptable to specific criteria.

A test container 6 is shown schematically in FIG. 3 which was produced from the test preform 4 of FIG. 2 by stretch blow molding. According thereto, the regular test pattern 15 on the test preform 4 is due to the blow molding process and the associated drawing of individual wall portions stretched apart to form a distorted test pattern 15'. For example, the distances between the individual grid lines or grid points in the longitudinal direction 20 in the stretched grid-like test pattern 15b' differ from the equidistant test pattern 15b on the test preform 4. As a view of the container base 6a of the test container 6 further shows, the concentric circular rings 15a on the test preform 4 can by the blow molding process in relation to the depicted circumferential line and/or the main axis 6d of the test container 6 be stretched to form distorted, in particular asymmetrically deformed rings 15a'. The distribution of individual lines or dots of the test pattern 15' sheds light on the particular distribution of the wall material and thereby the distribution of the local wall thickness of the test container 6.

The evaluation of the stretched test pattern 15' is preferably performed in a computing unit 11 with a suitable image processing program or the like. FIG. 3 by way of example shows a reference pattern 14 projected over a container view and defined within the context of the image evaluation, for example, as being concentric to the outer circumferential line of the test container 6 reproducibly determined by the blow cavity 2a. In the example, a substantially concentric distribution of individual rings 15a' would be desirable.

However, the method according to the disclosure is suitable not only for rotationally symmetrical containers but also for polygonal and/or elliptical cross-sections. Suitable reference patterns and target criteria can in the context of image evaluation be specified in a flexible manner. For example, concentric test patterns 15 adapted to the respective container cross-section can be used and the stretched test pattern 15' produced therefrom can be compared with corresponding reference patterns.

Target criteria for quality control are, for example, target image areas within which certain characteristic components, such as individual grid points or lines of the stretched test pattern 15' are to be located in the camera image. Target criteria derived therefrom are, for example, minimum requirements for the wall thickness and/or the fluctuation range of the local wall thickness in the inspected wall portions.

Due to the trackability of the product stream position P2 of individual test preforms 4 and the test container 6 blown therefrom, it can be determined with which blow cavity 2a and/or with which heating element 16a compliant or non-compliant test containers 6 were produced. Machine parameters of the blow molding machine 2 and/or of the furnace 16 can consequently be selectively altered to correct the production result of a certain blow cavity 2a and/or a certain heating element 16a. The production result after altering at least one machine parameter of the blow molding machine 2 and/or the furnace 16 can then be controlled by repeatedly infeeding the blow cavity 12a and/or the heating element 16a to be optimized, if necessary until an associated test container 6 is detected having the desired product quality.

Individual test cycles for individual blow cavities 2a and/or heating elements 16a can thus be performed. This is possible in the remaining blow cavities 2a, in particular, during the continuous production of product containers 7. Due to the trackable allocation of individual test preforms 4 and test containers 6 to the charged blow cavities 2a and/or heating elements 16a, the product quality can be optimized while simultaneously maintaining maximum production capacity of the blow molding machine 2.

Predefined test cycles, which are then performed, for example, in groups for all blow cavities 2a of the blow molding machine 2, can nevertheless be integrated automatically between production cycles after the lapse of a predetermined period of time and/or after the production of a predefined quantity of containers. For this purpose, a sufficient number of test preforms 4 is then to be fed into the incoming stream of product preforms 5 and to be evaluated according to the disclosure.

If the test results for all blow cavities 2a of the blow molding machine 2 are then within predetermined target ranges of the test parameters examined, then the respective blow cavities 2a are again fed the product preforms 5. If non-compliant deviations from the target values are detected for individual blow cavities 2a, then these blow cavities 2a can selectively be fed test preforms 4 until a desired product quality for the respective blow cavities 2a and/or heating elements 16a has been detected following the correction of suitable machine parameters of the blow molding machine 2 and/or the furnace 16.

The test containers 6 are preferably selectively separated by a discharge device 17 from the product outflow. The discharged test containers 6 can then additionally be measured and/or documented. However, it is also possible to print the test pattern 15 thereonto with ink or the like that is under normal conditions of use not visible to the human eye. Suitable for this purpose are, for example, fluorescent dyes that excite with ultraviolet radiation and can be detected by cameras 8, 9, 10. Likewise conceivable would be a dye that fades after termination of the control method according to the disclosure, for example, using suitable UV irradiation or the like. The test pattern 15' would then during subsequent use of the container no longer be visible to the human eye.

In addition to the test pattern 15, an identification marking 22 could be provided on the test preforms 4, for example, a character string and/or a machine-readable bar code or the like It would also be possible to design the identification marking 22 such that it can be read in particular after blow molding the test container 6, for example, in the form of an identification marking 22' that is modified by the blow molding. In this case, the product stream position P2 of individual test preforms 4 and/or test containers 6 could also be determined with the cameras 8, 9, 10 to allocate them to individual blow cavities 2a and/or heating elements 16a. However, selective clocking of the test preforms 4 using the infeed device 3 into the incoming product stream provides the advantage, however, that individual blow cavities 2a and heating elements 16a can specifically and selectively be fed test preforms 4, and image evaluation is necessary only selectively for test containers 6.

The control method according to the disclosure may preferably be preformed at product changeovers, change of product batches as a part of routine test cycles, and/or depending on inspection results obtained upstream of the blow molding machine 2.

The number of cameras 8, 9, 10 used in FIG. 1 for this purpose is merely by way of example. It would also be conceivable to arrange at least two cameras at an inspection position such as camera 9 shown in FIG. 1, which image the test containers 6 in partial views complementing each other. Cameras for imaging the container base 6 from beneath and for imaging selected side wall portions 6b could at an inspection position also be combined, for example, at the position of camera 8 shown in the figure. It would basically also be sufficient to use one of the cameras shown at the entry side in FIG. 1, in particular in an inspection position upstream of the furnace 16.

The use of individual heating elements 16a, one for each product preform 5 or test preform 4, is not absolutely mandatory. A heating section could be provided in a conventional manner which is passed by all product preforms 5 and test preforms 4. Similarly, the furnace 16 could be formed as a carousel furnace with individual heating elements 16, in particular, with individual heating chambers and/or heating rods for heating the preforms from the inside, for the product preforms 5, and the test preforms 4.

Any two-dimensional structures are basically suitable as the test pattern 15, for example, two-dimensional bar codes, circles, ellipses, rectangles, triangles, dot grids, regular waves or the like.

Controlling the test containers 6 on the exit side could be supported, for example, by illuminating a mist resulting from a pressure drop in the blow molded containers. Such mists favor uniform illumination of the interior of the container.

The invention claimed is:

1. A method for production control in stretch blow molding of plastic containers in a blow molding machine, comprising
   a) infeeding at least one test preform, with a printed test pattern, into a stream of product preforms entering said blowing molding machine;
   b) blowing said product preforms and said test preform during the continuous operation of said blow molding machine to form product containers and to form a test container; and
   c) imaging said test pattern on said test container with at least one camera.

2. The method according to claim 1, and registering said test pattern on said test preform by imaging.

3. The method according to claim 1, and said test preform is at a predetermined product stream position (P2) fed into the incoming stream of product preforms.

4. The method according to claim 1, and said test container is allocated a blow cavity of said blow molding machine for blowing said test container and/or a heating element for heating said test preform.

5. The method according to claim 1, and said imaged test pattern of said test container is measured by using image evaluation and/or compared with at least one reference pattern.

6. The method according to claim 5, and at least one machine parameter for heating and/or blowing said product preforms is evaluated and/or adjusted in dependency of a result obtained by said image evaluation.

7. The method according to claim 6, and said machine parameter is individually evaluated and/or adjusted for a blow cavity used for blowing said test container.

8. The method according to claim 7, wherein said blow cavity is selectively fed at least one further test preform when said machine parameter exceeds a permissible deviation from a target value.

9. The method according to at least one of the preceding claims, and said test preform is removed from a batch of product preforms to be processed and is provided with the printed test pattern.

10. The method according to claim 1, and said at least one test container is automatically controlled after production of a predetermined number of containers and/or after a predetermined production period.

11. A test preform for performing the method according to claim 1, and said test preform in terms of its wall material and its dimensions corresponds to a product preform, and a regular and/or equidistant test pattern is printed onto said test preform.

12. The test preform according to claim 11, and said test pattern is printed onto the base portion of said test preform in the shape of concentric rings or ring segments which are formed equidistant to each other and/or where said test pattern is printed onto a side wall portion of said test preform in the shape of a grid that is equidistant in the longitudinal direction and/or in the circumferential direction.

13. The test preform according to claim 11, and said test pattern comprises a fluorescent dye and is formed invisible to the human eye when illuminated in the visible spectral range.

14. The test preform according to one of the claims 11, and further comprising an identification marking printed on for identifying said test preform and/or said test container blown therefrom.

15. A blow molding machine for performing the method according to claim 1, comprising a clocked infeed device with which said test preform can be fed into the incoming stream of product preforms at a predetermined product stream position (P2) in order to selectively supply a blow cavity formed at said blow molding machine with said test preform, and with at least one camera for imaging said test container blown therefrom in said blow cavity.

16. The method according to claim 1, and the printed test pattern is one of a regular, equidistant and combination thereof test pattern.

17. The method according to claim 10, and said at least one test container comprises at least one test container for every blow cavity formed at said blow molding machine.

* * * * *